United States Patent [19]

Muraishi

[11] Patent Number: 4,695,097
[45] Date of Patent: Sep. 22, 1987

[54] SEAT FOR USE IN MOTOR VEHICLE
[75] Inventor: Masakazu Muraishi, Isehara, Japan
[73] Assignee: Nissan Motor Company, Limited, Japan
[21] Appl. No.: 909,120
[22] Filed: Sep. 17, 1986
[30] Foreign Application Priority Data
  Sep. 18, 1985 [JP] Japan .................. 60-207484
[51] Int. Cl.⁴ .............................. A47C 7/02
[52] U.S. Cl. ................... 297/452; 248/429; 297/344
[58] Field of Search ......... 297/344, 330, 452; 248/429, 430, 393
[56] References Cited
  U.S. PATENT DOCUMENTS
  3,924,892  12/1975  Geier ........................ 297/452

4,509,796  4/1985  Takagi ....................... 297/452
4,602,817  7/1986  Raftery ...................... 297/440
4,606,532  8/1986  Kazaoka et al. .............. 297/452

FOREIGN PATENT DOCUMENTS
59-14275  4/1985  Japan .
1088119  10/1967  United Kingdom .

Primary Examiner—James T. McCall
Attorney, Agent, or Firm—Lowe, Price, LeBlanc, Becker & Shur

[57] ABSTRACT

The movable rail of a seat sliding mechanism is detachably connected through bolts to a side frame of a rectangular seat cushion frame. Thus, fixing of a trimmed edge of an outer skin member of the seat cushion to the proper position of the side frame can be easily achieved with the movable rail unfastened from the side frame.

11 Claims, 6 Drawing Figures

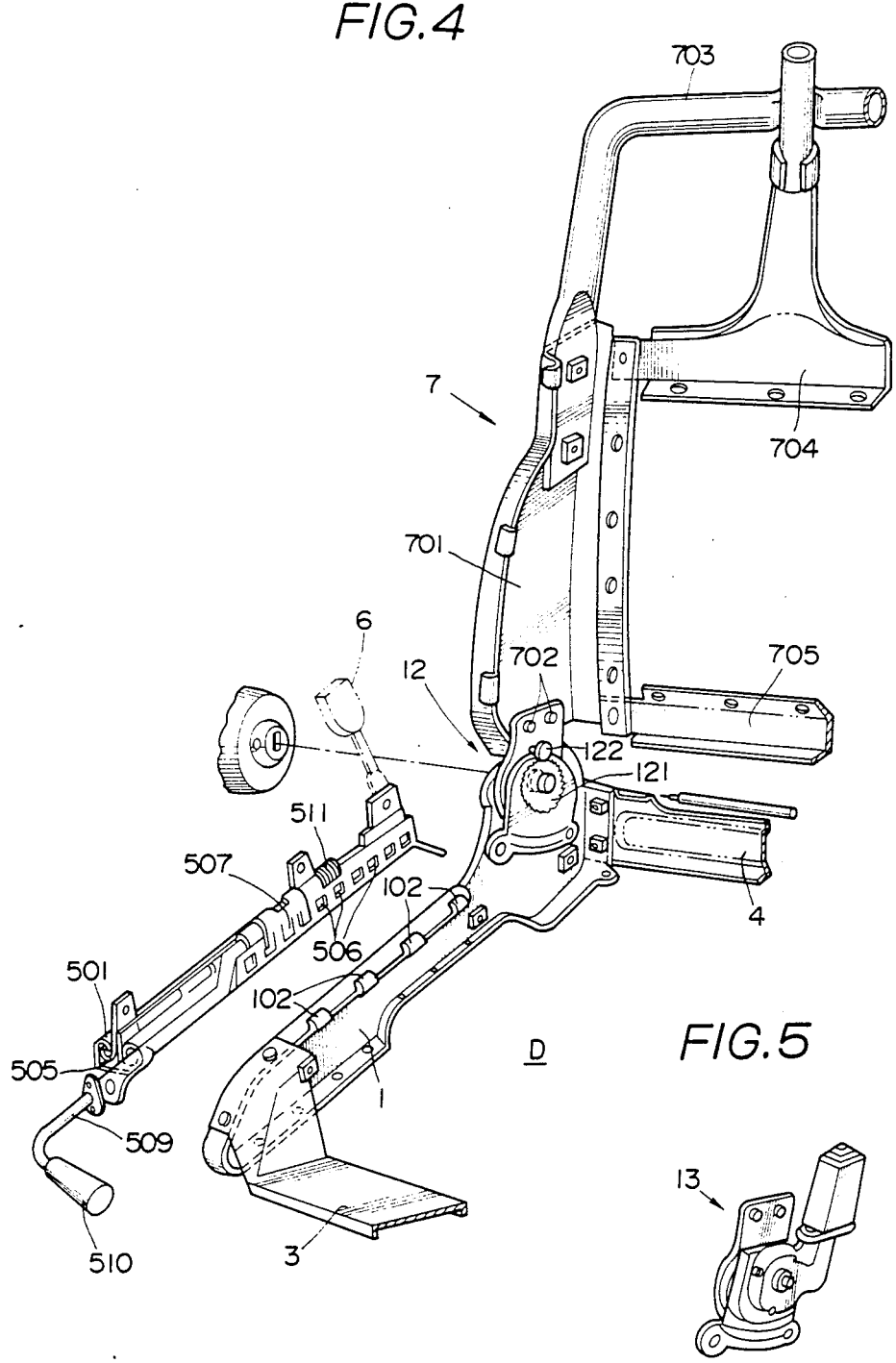
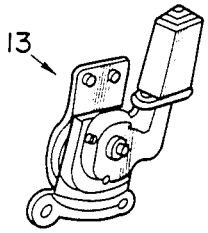

SEAT FOR USE IN MOTOR VEHICLE

BACKGROUND OF THE INVENTION

1. Field of the Invention

The present invention relates in general to seats and more particularly to seats for use in motor vehicles. More specifically, the present invention is concerned with seats of a type which is designed to facilitate its assembly.

2. Description of the Prior Art

Hitherto, various kinds of seats for motor vehicles have been proposed and put into practical use. Some are of a type having a seat position adjuster by which a fore-and-aft positioning of the seat is effected. One of them is disclosed in Japanese Utility Model Second Provisional Publication No. 59-14275, which generally comprises a seat cushion part covered with an outer skin member, a seat back part pivotally connected to the seat cushion part through a reclining device, and a seat slide device (or seat position adjuster) interposed between the seat cushion part and the vehicle floor to achieve the fore-and-aft positioning of the seat relative to the vehicle floor. However, the seat of this publication has the following drawbacks:

(1) Since the movable rail of the seat slide device and the side frame of the seat cushion part are integrally connected, it is difficult and troublesome to fix the trimmed edge of the outer skin member of the seat cushion part to proper position of the side frame. That is, due to the presence of the integrally connected movable rail, the trimmed edge fixing procedure should be made by stretching operator's hand or hands awkwardly.

(2) Since the seat employs only one slide lock device, durability of the seat against a considerable shock, such as a shock of vehicle collision, is poor.

(3) Due to the inherent construction of the seat cushion frame, replacement of a seat cushion pad on the frame with another one is not easily achieved. This restricts the applicability of the seat to various motor vehicles.

SUMMARY OF THE INVENTION

It is therefore an essential object of the present invention to provide a seat which is free of the above-mentioned drawbacks.

According to the present invention, there is provided an improved seat mounted on a floor of a motor vehicle. The seat comprises a rectangular seat cushion frame including two spaced side frames, a front frame having axially opposed ends detachably connected to respective front portions of the side frames, and a rear frame having axially opposed ends detachably connected to respective rear portions of the side frames; and a seat sliding mechanism including two spaced stationary rails which are secured to the floor in a manner to extend along the respective side frames, and two movable rails which are slidably mounted on the respective stationary rails and detachably connected to the respective side frames.

BRIEF DESCRIPTION OF THE DRAWINGS

FIG. 4 is a view also similar to FIG. 1, but showing a fourth embodiment of the present invention;

FIG. 5 is a perspective view of a modified part which is employable in the fourth embodiment of FIG. 4.

DETAILED DESCRIPTION OF THE INVENTION

Figure 1:
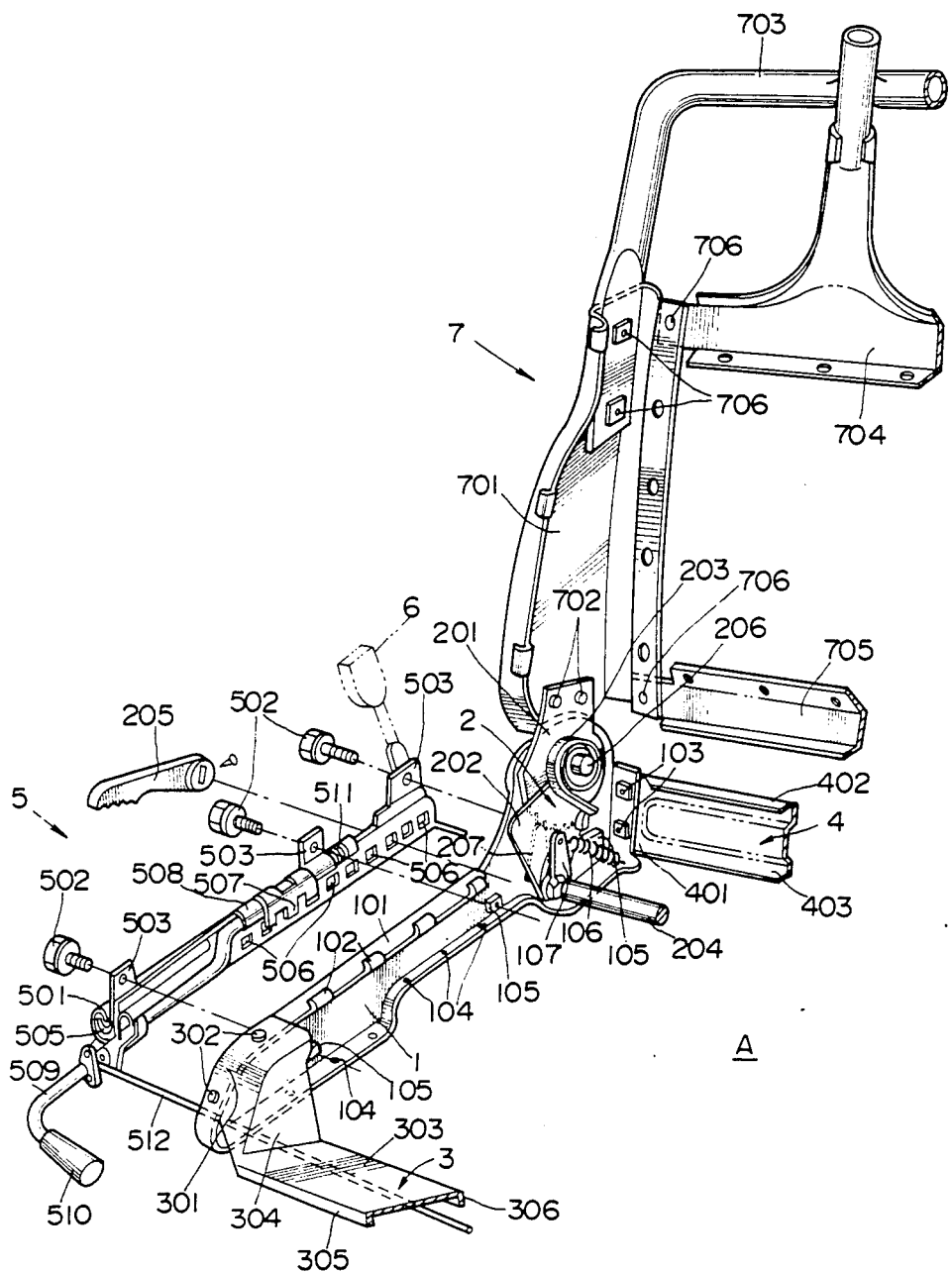
FIG. 1 is a partial and perspective view of a framework of a seat which is a first embodiment of the present invention.

Throughout the specification and drawings, like parts are designated by the same numerals and detailed explanation of such parts will be made once for facilitation of the description, and the terms "front", "rear", "upward", "downward" or the like is to be understood as referring to "front", "rear"... "downward" as viewed in the corresponding drawings.

Furthermore, in the drawings, only the parts and constructions constituting a left section of the corresponding seats are illustrated because the basic construction of the right section is substantially the same as that in the left section.

Referring to FIG. 1, there is shown a first embodiment of a seat of the present invention, which is generally designated by reference "A". The seat "A" comprises parallel side frames 1 (only one is shown) which extend longitudinally with respect to a vehicle floor (not shown) on which the seat "A" is mounted. As shown, each side frame 1 is formed with an inwardly projected flange 101 along the periphery thereof except a rear upper portion thereof. As will be described in detail hereinafter, a reclining device 2 is mounted to the rear portion. A plurality of spaced retainers 102 are formed on the upper part of the flange 101 of each side frame. Although not shown in the drawing, a plurality of S-springs expand between the side frames 1 with their both ends hooked to the retainers 102. The lower part of the flange 101 of each side frame 1 is formed with a plurality of openings 104. Although not showin in the drawing, upon assembly, a plurality of wire clips fixed to an outer skin member of the seat cushion are brought into engagement with the openings 104 so as to stretch the outer skin member on a seat cushion proper.

Designated by numeral 4 is a rear frame which is detachably connected at its both ends 401 to the rear end portions of the side frames 1. For this connection, the rear end portion of the flange 101 of each side frame 1 is equipped with nuts 103 with which bolts extending from the rear frame 4 are detachably engaged. As shown, the rear frame 4 is formed with upper and lower flanges 402 and 403 each being projected inwardly as shown. Designated by numeral 3 is a front frame which is detachably connected at its both ends to the front end portions of the side frames 1 by means of screws 302. The front frame 3 has a stepped configuration comprising a flat major portion 303, side walls 304 (only one is illustrated) respectively extending upward from the longitudinally opposed ends of the major flat portion 303, and side flanges 301 (only one is illustrated) extending laterally outwardly from the upper ends of the side wall portions 304. Upon assembly, the front frame 3 is arranged with the flat major portion 303 thereof sloped down somewhat toward the rear of the seat "A". As will become clear as the description proceeds, the inclined arrangement of the major flat portion 303 prevents forward slippage of the seat cushion proper mounted thereon. The major portion 303 is formed with front and rear flanges 305 and 306 each being projected downward. The side frames 1, the rear frame 4 and the front frame 3 thus constitute a generally rectangular seat cushion frame on which the seat cushion proper is mounted.

Designated by numeral 5 is a seat sliding mechanism which comprises a stationary rail 501 detachably fixed to the vehicle floor and a movable rail 505 slidably disposed on the stationary rail 501 and detachably fixed to the side frame 1. For the detachable connection between the movable rail 505 and the side frame 1, the movable rail 505 is formed with apertured brackets 503 through which bolts 502 pass to engage with nuts 105 secured to the side frame 1. Although not shown in the drawing, substantially the same stationary and movable rails are arranged in the right section of the seat "A", so that the rectangular seat cushion frame can slide in a fore-and-aft direction relative to the vehicle floor.

The stationary rail 501 is formed with a plurality of aligned openings 506, and the movable rail 505 carries by means of a curled bracket 508 thereof an operation rod 509 which has a pawl 507 lockably engageable with any of the openings 506. A coil spring 511 is disposed about a rear end of the rod 509 to bias the same in a direction to engage the pawl 507 with the openings 506. The front portion of the operation rod 509 is bent at generally right angles to form a grip 510 which is manipulated by an operator or seated occupant. With these parts, a so-called "position setter" is constituted which, upon engagement of the pawl 507 with one of the openings 506, locks the rectangular seat cushion frame and thus the seat proper at a selected fore-and-aft position relative to the vehicle floor. Although not shown in the drawing, a substantially same position setter except for the grip 510 is associated with the right-positioned rails.

A release wire 512 extends from the operation rod 509 of the illustrated position setter to the corresponding rod of the other position setter (not shown), so that the pivotal movement of the rod 509 about the axis thereof is transmitted to the corresponding rod of the other position setter to achieve synchronous and analogous locking and unlocking operations of the two position setters. As is seen from the drawing, the release wire 511 extends below the front frame 3. Designated by numeral 6 is an anchor member for a seat belt (not shown), which is secured to the apertures bracket 503 by the bolt 502.

Designated by numeral 7 is a seat back frame which is pivotally connected to the rear portion of the rectangular seat cushion frame through the reclining device 2. The reclining device 2 comprises a pivotal arm 201 which is secured through rivets 702 to a side frame 701 of the seat back frame 7 and pivotally connected through a pivot shaft 206 to the rear end portion of the side frame 1. The lower end portion of the arm 201 is formed with a plurality of teeth (no numerals) for the purpose which will become clear hereinafter. A base plate 202 is secured to the rear end portion of the side frame 1 leaving therebetween a considerable space within which the toothed lower end portion of the pivotal arm 201 is received. The upper portion of the base plate 202 bears an inward portion of the pivot shaft 206 for achieving tight holding of the shaft 206. Designated by numeral 203 is a coil spring which is disposed about the pivot shaft 206 in a manner to bias the seat back frame 7 to pivot forward about the pivot shaft 206.

Lockably engageable with the teeth of the arm 201 is a pawl member 207 which is received in the space between the side frame 1 and the base plate 202. The pawl member 207 is secured to an elongate transmission rod 204 which extends across the side frames 1 of the rectangular seat cushion frame, so that the pawl member 207 is pivotal together with the transmission rod 204 about the axis of the same. It is to be noted that another reclining device having substantially the same construction as the above-mentioned device 2 is assembled in the non-illustrated right section of the rectangular seat cushion frame. Thus, a pivotal movement of the transmission rod 204 about the axis thereof in a given direction, that is, in a clockwise direction as viewed in FIG. 1, brings about a locking engagement between the pawl members 207 and the teeth of the pivotal arms 201 and thus locks the seat back frame 7 at a selected angular position relative to the seat cushion frame. For biasing the transmission rod 204 in the given direction, a spring 106 expands between the side frame 1 and an arm 107 secured to the transmission rod 204.

Designated by numeral 205 is a handle which is secured to an axial end of the transmission rod 204 for manipulating the rod. The seat back frame 7 comprises the side frames 701 (only the left-positioned one is illustrated), a generally U-shaped upper frame 703, a generally T-shaped intermediate frame 704 and a lower frame 705 which are assembled by means of bolts and nuts 706.

In the following, advantageous features of the seat "A" will be itemized.

(1) Since the entire construction of each sliding mechanism 5 is detachable from the side frame 1 of the seat cushion part, fixing of a trimmed edge of the outer skin member of the seat cushion to the proper position of the side frame 1 can be made with ease. That is, upon assembly, the trimmed edge fixing procedure can be carried out prior to fixing the sliding mechanism 5 to the side frame 1.

(2) Since the seat "A" employs two slide lock devices (or position setters) which are respectively associated with the two sliding mechanisms 5, durability of the seat against a considerable external force suddenly applied thereto is improved.

(3) Because of the same reason as that mentioned in the item (1), replacement of a seat cushion proper with another can be easily effected. Thus, applicability of this seat "A" is widened.

Figure 2:
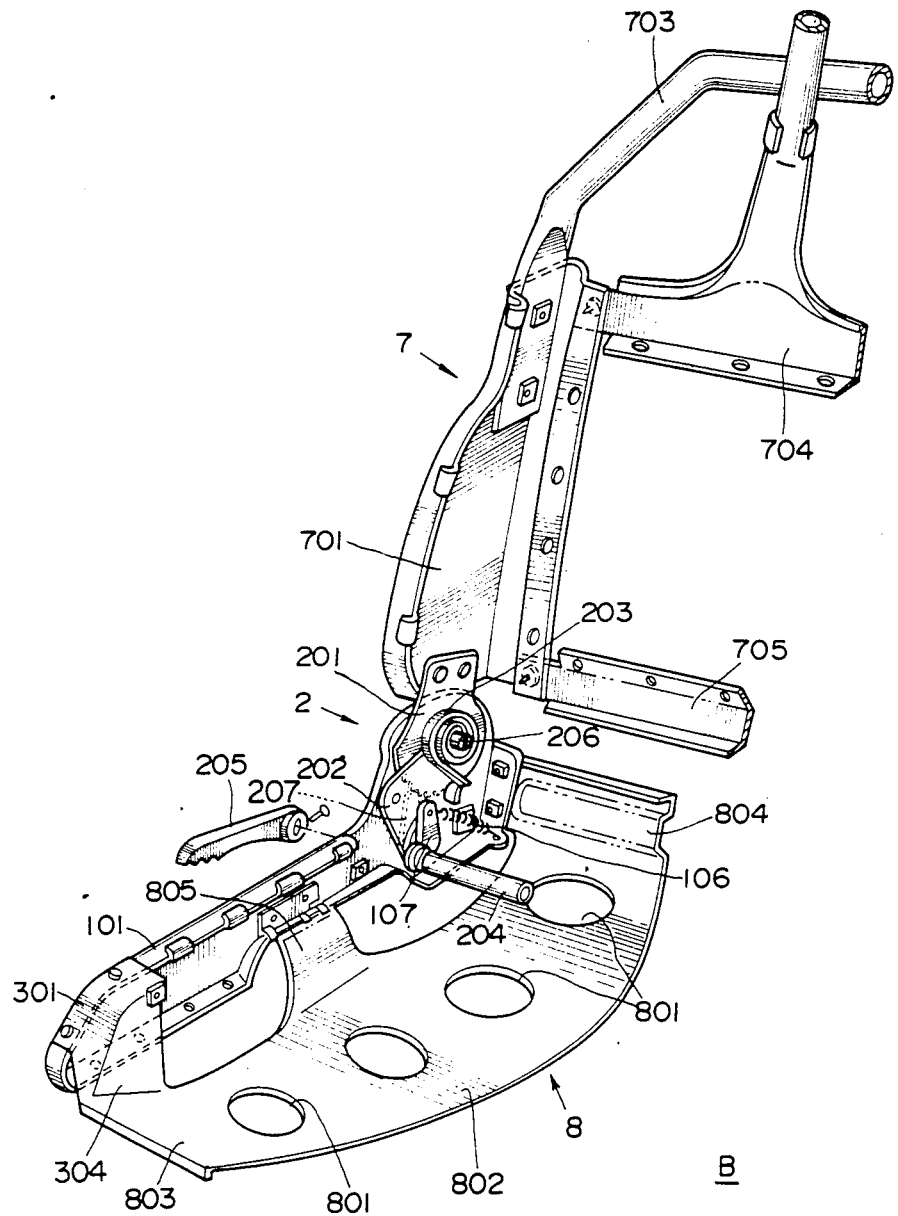
FIG. 2 is a view similar to FIG. 1, but showing a second embodiment of the present invention.

Referring to FIG. 2, there is shown a second embodiment "B" of the present invention. The seat "B" of this embodiment is substantially the same as that of the first embodiment "A" except for the front and rear frames of the rectangular seat cushion frame. That is, as is seen from the drawing, an enlarged curved plate 8 is used as a substitute for the front and rear frames 3 and 4 of the first embodiment "A". For weight reduction, the plate 8 is formed with several apertures 801. The plate 8 comprises a curved and apertured major portion 802, a front portion 803 of the shape corresponding to the front frame 3 of the first embodiment, and a rear portion 804 of the shape corresponding to the rear frame 4 of the same. The front and rear portions 803 and 804 are detachably connected to the side frames 1 in substantially the same manner as the first embodiment "A". As shown, the plate 8 further comprises an intermediate bracket 805 the leading end of which is detachably connected to the lower flange 101 of the side frame 1. In this second embodiment "B", an enlarged cushion pad, such as polyurethane pad or the like can be put on the plate 8. Of course, the advantageous features of the first embodiment "A" are equally obtained by this second embodiment "B".

Figure 3:
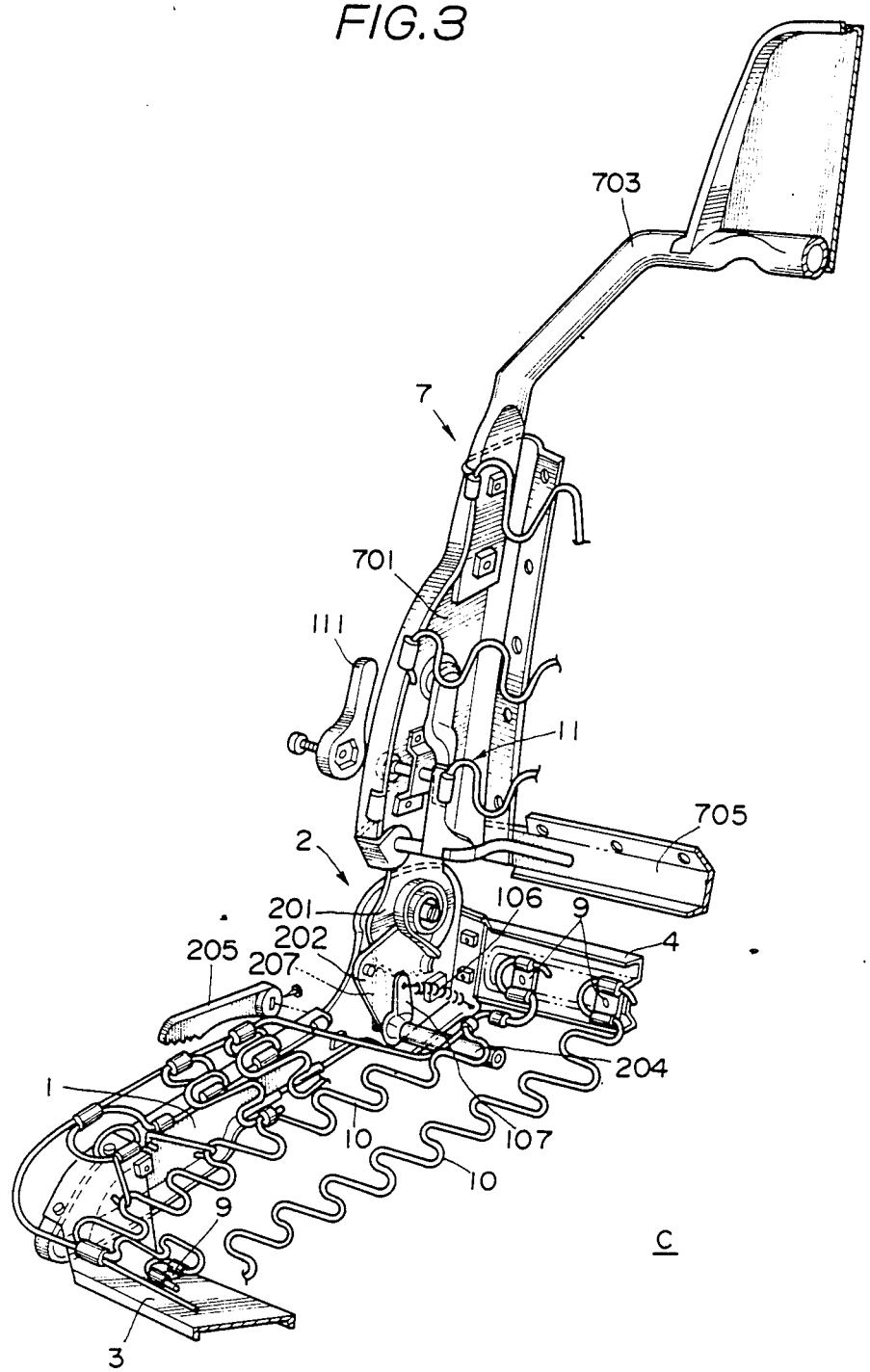
FIG. 3 is a view also similar to FIG. 1, but showing a third embodiment of the present invention.

Referring to FIG. 3, there is shown a third embodiment "C" of the present invention. Similar to the aforementioned first embodiment "A", the front and rear frames 3 and 4 are employed in the third embodiment "C". Further, in this third embodiment, suitable numbers of hooks 9 are welded to the front and rear frames 3 and 4 in order to expand springs 10 between the frames 3 and 4, as shown. Designated by numeral 11 is a known adjustable side supporter which is mounted on the side frame 701 of the seat back frame 7. Designated by numeral 111 is a handle for manipulating the side supporter.

Referring to FIG. 4, there is shown a fourth embodiment "D" of the present invention. The seat "D" of this embodiment is substantially the same as the first embodiment "A" except for the reclining device. The reclining device 12 in this embodiment "D" has no handle corresponding to the handle 205 of the first embodiment. That is, the device 12 is of a known type which comprises a ratchet wheel 121 rotatable in response to the pivot movement of the seat back frame 7, and a pawl 122 engageable with the ratchet wheel 121 to suppress reverse rotation of the same. If desired, a power reclining device 13 as shown in FIG. 5 may be employed in the seat of the invention.

Figure 6:
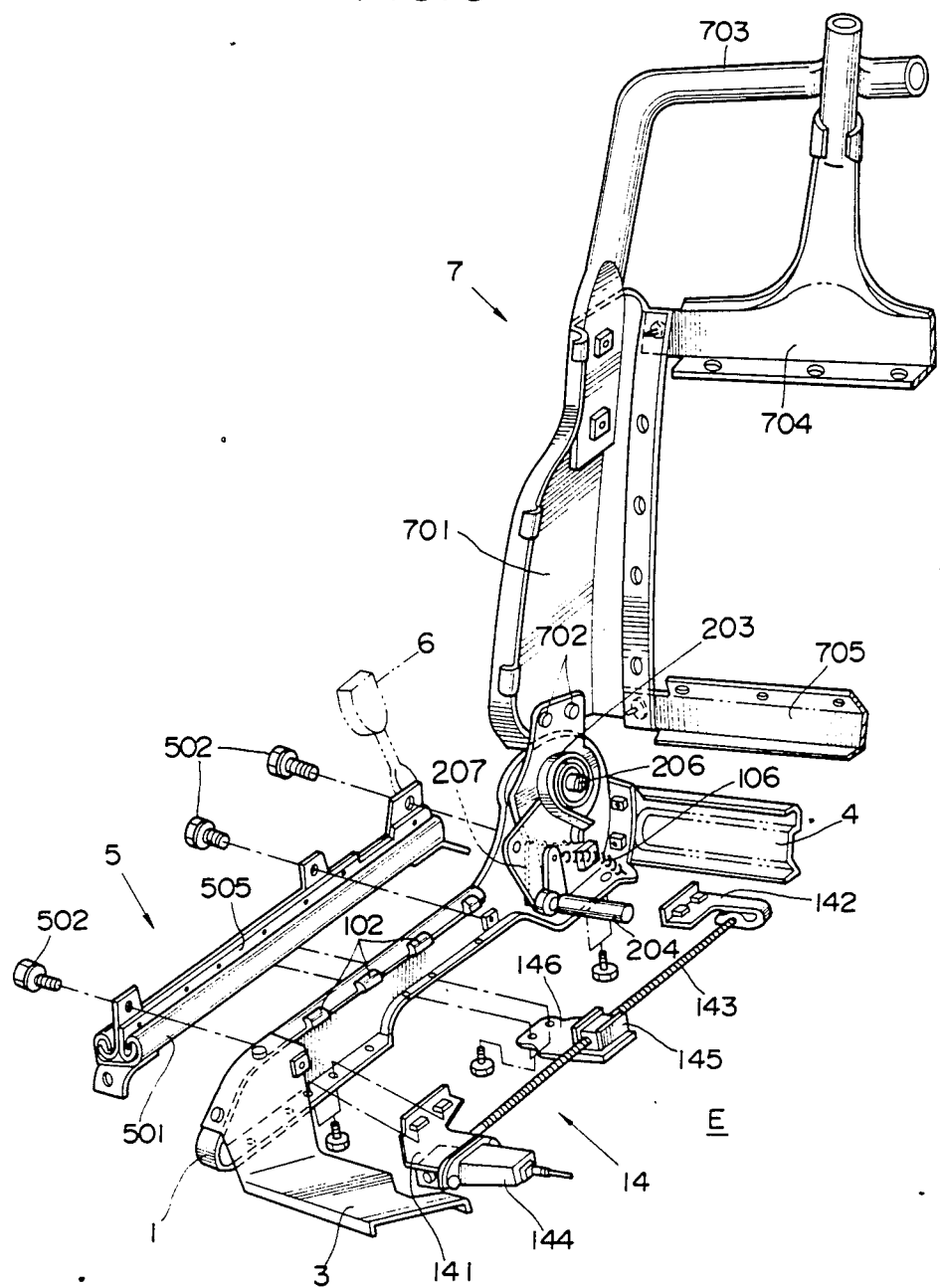
FIG. 6 is a view also similar to FIG. 1, but showing a fifth embodiment of the present invention.

Referring to FIG. 6, there is shown a fifth embodiment "E" of the present invention. The seat "E" of this embodiment is substantially the same as the seat "A" of the first embodiment with the exception of the seat sliding mechanism. That is, in this fifth embodiment "E", a power sliding mechanism 14 is employed for adjusting the fore-and-aft position of the seat "E". The power sliding mechanism 14 comprises a pair of rail units 5 each including a stationary rail 501 secured to the vehicle floor and a movable rail 505 slidably disposed on the stationary rail 501 and fixed to the corresponding side frame 1 of the seat cushion frame through bolts 502. Front and rear brackets 141 and 142 are bolted to the front and rear portions of the side frame 1. A threaded shaft 143 extends between the two brackets 141 and 142 in a manner to be rotatable about the axis thereof. An electric motor 144 is mounted to the front bracket 141 and connected through a suitable speed reduction gear (not shown) to the threaded shaft 143 so that upon energization of the motor 144, the threaded shaft 143 rotates about its axis at a reduced speed. A nut 145 mounted on a bracket 146 is threadedly engaged with the threaded shaft 143. The bracket 146 is bolted to the stationary rail 501, so that the rotation of the shaft 143 due to operation of the motor 144 induces an axial movement of the seat proper relative to the vehicle floor. Because of the same reasons as those mentioned in the first embodiment "A", the advantageous features of the embodiment "A" are equally obtained by the third, fourth and fifth embodiments "C", "D" and "E".

What is claimed is:

1. A seat mounted on a floor of a motor vehicle, comprising:
    a generally rectangular seat cushion frame including two spaced side frames, a front frame having axially opposed ends detachably connected to respective front portions of said side frames, and a rear frame having axially opposed ends detachably connected to respective rear portions of said side frames; and
    a seat sliding mechanism including two spaced stationary rails which are detachably secured to said floor in a manner to extend along the respective side frames, and two movable rails which are slidably disposed on the respective stationary rails and detachably connected to the respective side frames; said front frame having a major flat portion which is sloped down toward the rear of said seat cushion frame, said front frame also including side walls which respectively extend upward from the longitudinallly opposed ends of said major flat portion and are detachably connected to respective upper sides of said front portions of said side frames, and wherein each side frame of said rectangular seat cushion frame is formed with an inwardly projected flange along the periphery thereof except for the rear portion thereof.

2. A seat as claimed in claim 1, in which said flange of each side frame is formed with a plurality of spring retainers at the inwardly projected edge thereof.

3. A seat as claimed in claim 2, in which said front and rear frames are integrally connected to form a monolithic plate member.

4. A seat as claimed in claim 3, in which said monolithic plate member is integrally formed with an intermediate bracket the leading end of which is detachably connected to the flange of said side frame.

5. A seat as claimed in claim 2, in which said front and rear frames have respectively spring retaining hooks welded thereto.

6. A seat as claimed in claim 2, further comprising a position setter which includes:
    a plurality of axially aligned openings formed in each of said stationary rails;
    an operation rod rotatably held by each of said movable rails, said operation rod having a pawl which, upon rotation of the rod in a given direction, is brought into locking engagement with any of the openings of said stationary rail;
    a coil spring disposed about said operation rod to bias said operation rod in a direction to bring said pawl into locking engagement with any of the openings of each startionary rail;
    a release wire extending between the respective operation rods so as to transmit the rotational movement of one of said operation rods to the other; and
    a grip formed on one of said operation rods to be manipulated.

7. A seat as claimed in claim 2, further comprising a powered position setter which includes:
    front and rear brackets detachably connected to the front and rear portions of said side frame of the rectangular seat cushion frame;
    a threaded shaft extending between said front and rear brackets in a manner to be rotatable about the axis thereof;
    an electric motor mounted to one of said front and rear brackets and connected through a speed reduction gear to said threaded shaft;
    a nut threadedly engaged with said threaded shaft; and
    a bracket mounting thereon said nut and detachably connected to said stationary rail.

8. A seat as claimed in claim 2, further comprising a seat back frame which is pivotally connected through a reclining device to the respective rear portions of said side frames of the rectangular seat cushion frame.

9. A seat as claimed in claim 8, in which said reclining device comprises:
   a pivot arm secured to each side portion of said seat back frame and pivotally connected through a pivot shaft to the rear end portion of each side frame of the rectangular seat cushion frame, said pivot arm being formed with a plurality of teeth;
   a base plate secured to the rear end portion of each side frame leaving therebetween a considerable space within which the toothed portion of said pivot arm is received, the upper portion of said base plate bearing a portion of said pivot shaft for achieving assured holding of the shaft;
   a coil spring disposed about said pivot shaft to bias the seat back frame to pivot forward about the pivot shaft;
   a transmission rod extending across the side frames in a manner to be rotatable about the axis thereof;
   a pawl member secured to said transmission rod and lockingly engageable with the toothed portion of said pivot arm;
   biasing means for biasing the transmission rod in a direction to bring said pawl member into locking engagement with the toothed portion of said pivot arm; and
   a handle secured to an axial end of the transmission rod to manipulate the same.

10. A seat as claimed in claim 8, in which said reclining device comprises:
    a ratchet wheel rotatable in response to the pivotal movement of the seat back frame; and
    a pawl lockingly engageable with the ratchet wheel to suppress reverse rotation of the same.

11. A seat as claimed in claim 10, in which said reclining device further comprises an electric motor which, upon energization thereof, forces said seat back frame to pivot in a certain direction relative to said rectangular seat cushion frame.

* * * * *